:::
3,332,487
AEROBIC BACTERIA IN OIL RECOVERY
Loyd W. Jones, Tulsa, Okla., assignor to Pan American Petroleum Corporation, Tulsa, Okla., a corporation of Delaware
No Drawing. Filed Sept. 30, 1963, Ser. No. 312,327
9 Claims. (Cl. 166—11)

ABSTRACT OF THE DISCLOSURE

An oil-bearing underground formation is treated with aerobic bacteria, oxygen, and sufficient cooling fluid to prevent rise of temperature above about 150° F. Resulting oxygenated products can be recovered or used in such ways as miscible fluid drive, underground fuel cells or the like. The aerobic bacteria and their products can be attacked by anaerobic bacteria introduced with or following the aerobes. The bacteria may be used in fractures.

---

The use of bacteria in oil recovery has been under consideration for many years. For example, U.S. Patent 2,413,278 Zobell proposes the use of certain anaerobic bacteria to aid in displacing oil from oil-bearing formations. Other workers have also limited themselves to the use of anaerobic bacteria since oil-bearing formations contain no oxygen. In addition, the slow low-energy reactions characteristic of the anaerobes have less tendency to generate sufficient heat to raise temperatures above the level at which bacteria can live.

Anaerobic bacteria, however, because they rely on the slow low-energy reactions, cannot attack the low molecular weight hydrocarbons containing less than about 10 carbon atoms per molecule. The anaerobes can, of course, attack the higher molecular weight hydrocarbons to produce carbon dioxide. This carbon dioxide dissolves in the remaining oil to increase its volume and decrease its viscosity. If only partial oxidation occurs, however, only high-melting acids and waxes are produced which may precipitate from the oil and cause plugging. In addition, the slow rate of the reactions is undesirable since this slow rate delays the oil recovery operation. Most of these characteristics are well summarized in the book, Petroleum Microbiology, by Ernest Beerstecher, published in 1954 by Elsevier Press, Inc., of Houston, Tex.

With these difficulties in mind, it is an object of this invention to provide a more rapid process employing bacteria for oil recovery. Another object is to provide a method in which the low molecular weight hydrocarbons are attacked since the partial oxidation products of these are low molecular weight alcohols, aldehydes, ketones and acids which act as viscosity reducing solvents for the remaining oil and many of which are mutual solvents for oil and water, thus permitting a form of miscible fluid drive when water is introduced through the formation following the bacteria.

In general, I accomplish the objects of my invention by the use of aerobic bacteria and air. Unfortunately, the solution is not quite this simple since the use of aerobics and air introduces several problems. The reactions caused by the aerobic bacteria release considerably more energy than reactions due to the anaerobes. The reactions of the aerobes are also usually much more rapid. The rapidity is desirable except that the result is a much more rapid production of heat. This may be sufficient to cause spontaneous ignition of the oil in the formation which is in contact with the air necessary for the continued growth of the aerobes. This is particularly true since the partial oxidation products, such as the alcohols, aldehydes and ketones, are more easily oxidized by the oxygen than were the original hydrocarbons. Even if the organic materials in the formation do not spontaneously ignite, it will be apparent that the temperature may rapidly exceed the level at which the bacteria can survive. Such problems have discouraged previous consideration of aerobic bacteria for oil recovery.

I propose to overcome these problems by injecting with the batceria and oxygen a cooling fluid in an amount sufficient to prevent rise of the temperature above the desired level. This fluid may be a gas such as nitrogen or carbon dioxide or it may be a liquid such as water, a light hydrocarbon, or the like. The amount of cooling fluid will, of course, depend upon the conditions. If the formation temperature is aready near the upper limit at which the bacteria can grow, the amount of cooling fluid will have to be large. This is particularly true if the bacteria is of a very active type which converts most of the hydrocarbons to carbon dioxide and water and thus releases a maximum amount of energy in a short time. If, on the other hand, the natural formation temperature is low, the temperature at which the bacteria can grow is high, and if the bacteria acts relatively slowly and produces principally partial oxidation products, then a smaller amount of cooling liquid will be required.

When air is used as the source of oxygen, about 600 gallons of water for each 1,000 cubic feet of air at standard conditions will permit a temperature rise of about 20° F. provided all the oxygen in the air is converted to carbon dioxide and water. This value ignores the amount of heat required to raise the temperature of the formation and the fluids naturally present. It also ignores the heat which is lost by incomplete oxidation. It will be apparent, then, that an amount of water less than 600 gallons per 1,000 cubic feet of air will ordinarily be adequate to limit the temperature rise to 20° F. This water-to-air ratio can be used, however, as a general guide in estimating the ratio to use in any particular reservoir when using any specific cooling fluid with any selected species or group of species of bacteria. Water is the preferred cooling liquid since it serves to maintain a high water saturation in the reservoir. This condition promotes growth of bacteria and avoids the drying action of the air.

The selection of bacteria can be made from species known to oxidize hydrocarbons. Many of these are available and have been identified in references such as the Beerstecher book previously mentioned. These species may include those such as *Pseudomonas fluorescens, Pseudomonas aeruginosa, Pseudonomas oleovorans, Mycococcus ruber, Methanomonas methanica, Mycobacterium smegmatis, Nocardia paraffinae,* and the like. It is ordinarily preferable, however, to employ bacteria naturally present in soils, tank bottoms, ponds, or the like. These should be cultured in the presence of a sample of the oil present in the formation to be treated. Although some soils may not naturally contain species which oxidize hydrocarbons, most soil will ordinarily include species which can adapt themselves readily to hydrocarbon utilization. Those species which cannot adapt are eliminated or forced into an inactive form where they do not affect the process.

This tendency of bacteria to adapt to new conditions actually makes somewhat useless the careful selection of species of bacteria for use in an environment such as a petroleum reservoir which is so unlike the natural habitat of most bacteria. The changed environment is almost certain to result in adaptation of the organism, resulting in a form which may be quite unlike the injected species.

It may be desirable to adapt bacteria through several stages to the conditions of final use. For example, the bacteria may first be cultured in a good culture medium in contact with oil from the formation to be treated. In this first step the temperature, pressure, and nutrient solution composition may be maintained near those of the natural habitat of the bacteria. Second, a sample of the resulting bacteria from the first culture can then be employed in the presence of the oil at a temperature near the expected formation temperature. Third, a sample from the second culture can be cultured further under the pressure and temperature expected in the reservoir. Finally, the water phase composition can be changed to that to be used for introducing the bacteria into the formation. In this manner the bacteria can adapt in steps to a form which will be effective under reservoir conditions. Thus, while many reservoir temperatures are too high for the effective growth of the species named above, it is well known that thermophilic strains can be developed of many species. Some of these grow well at temperatures as high as about 150° F. It is preferred, therefore, that bacteria adapted by a method such as that outlined above be employed to develop suitable bacteria species rather than employing any of the species known to be effective at conditions on the surface of the earth.

The adaptation process described in simple terms above may actually be carried out over a long period of time and through many stages in order to obtain strains of bacteria having particularly desirable properties. Such culturing techniques to obtain species of bacteria having special properties are well known in the art.

It may be desirable to perform an additional step at least once in the process of culturing bacteria for use in underground formations. This is a filtration step. Many bacteria tend to exist in clusters of filaments or to develop stalks too large to enter the matrix pores of formations. Many others exist principally as single or paired cells small enough to enter most formation pores. Thus, water dispersions of cultures may be filtered through sand beds or other filtering media sometime during the adapting process to eliminate at least the worst cluster and filament formers, leaving principally those which can enter formation pores. It is possible also to culture the bacteria in a sand bed. The bacteria which are withdrawn will be those which are small and at least some of which will move readily past surfaces without adhering to the surfaces. Spore-forming species are particularly desirable since the spores are ordinarily quite small and some do not stick readily to surfaces. These spores can, therefore, travel easily through formations for great distances before developing into the active growing form of the bacteria.

Techniques for eliminating the colony-forming species of bacteria are always desirable, but in some cases are not strictly necessary. Many, if not most, formations include highly permeable streaks, frequently fractures, through which large colonies can flow with little difficulty. Once established in a fracture, a colony can then grow into the matrix pores even if it is too large to flow through the pores.

If fractures do not naturally exist in the formation, it is usually desirable to form them artificially. Thus, a fracture may be formed extending into the bottom of the formation from the injection well. Another fracture may be formed extending into the top of the formation from a producing well. This greatly decreases the distance which the bacteria must flow or grow through the formation matrix pores. The bacteria may be injected as a suspension in a non-aqueous liquid such as kerosene to improve penetration into the formation. This step also has the advantage of re-establishing a continuous oil phase in a reservoir which has been water flooded, for example.

Fractures in formations perform another very useful function. They aid in conducting oxygen to bacteria far back in the formation. In the absence of fractures there is a tendency of the aerobic bacteria near the injection well to use the available oxygen leaving little, if any, for the aerobes further back in the formation. The fractures aid in conducting the air far back into the formation with little loss. Again, a pair of fractures as described above is advisable to shorten the distance through which the air must flow through the matrix pores in its path from the injection well to the producing well.

One of the advantages of the use of bacteria is the partial plugging action which occurs in the pores of the formation when the bacteria grow and multiply. In any gas drive or water drive operation the gas or water tends to take the shortest and easiest path between the injection and production wells. Growth of bacteria in these short, easy paths of flow, however, tends to plug the paths and force the flow of fluids through portions of the formations which would not be reached by normal flooding operations.

This plugging tendency is particularly useful in the one-well recovery system where the bacteria, air, and cooling fluid are injected into the formation above or below a packer in a well and forced to flow through the formation to the portion of the well on the other side of the packer. In the absence of a plugging action, the injected fluids flow mostly through the portion of formation close to the well opposite the packer, since this is the shortest path through the formation. Due to the plugging action of the bacteria, however, the injected fluids are forced to flow far out into the formation to find higher permeability paths.

In some cases where partial plugging diverts flow into other portions of the reservoir, it may be desirable to inject bacteria cultures occasionally to insure their presence in the new flow paths. Usually, this is not necessary since the bacteria will grow into any zones where oxygen and nutrients are available. This is particularly true for some of the more motile forms of bacteria. Nevertheless, occasional injection of bacteria insures the most rapid growth of bacteria in all flow paths with consequently quick production of residual oil or products of bacterial growth.

Occasional injection of bacteria with the air and cooling fluid also has the advantage of reinoculating zones from which the air may have been cut off by plugging action upstream. Such reinoculation generally is not necessary for two reasons: first, most bacteria can assume a resting stage where they do not grow, but neither do they die. Spores are a form of this resting stage in some species. Therefore, temporary depletion of the oxygen supply usually does not result in death of all of the aerobes. Second, the air has a very low viscosity compared to either the cooling water or the culture solution. Therefore, at least a limited amount of air will almost always flow through the water and culture by a fingering action, even though the flow of liquids is substantially stopped.

If plugging reaches the point where injection of air and cooling water becomes severely limited, it may be desirable to destroy a portion of the bacteria at least near the injection well. This may be done by the injection of hypochlorite solutions, peroxide solutions, sodium hydroxide solutions or the like which are known to decompose the aerobic bacteria and the slimes which they form. In some cases reinoculation may be advisable because of the possibility that the chemicals have destroyed more than the desired quantity of bacteria.

A convenient way to decrease the formation plugging is to inject some anaerobic bacteria with the aerobic bacteria. These should preferably be facultative anaerobes which can tolerate the oxygen introduced to cause growth of the aerobes. Even some of the obligate anaerobes seem to be able to assume resting stages, however, which can tolerate oxygen for extended periods of time. If the aerobes are cultured from soil samples or other natural sources of this type, there will almost always be at least a few anaerobic species present. With these present, it is only necessary to decrease or stop air injection for a short time to permit the oxygen content of gases in the formation to drop. The aerobes then become dormant or die while the anaerobes become active to destroy, at least partially, the masses of aerobic bacteria and, particularly, the slimes which are largely responsible for the plugging action. The principal products of the anaerobes, being mostly gases, do not tend to plug the formation. It may be desirable to flood the formation with a large batch of water after stopping injection of air. This is to decrease the air saturation of the formation and thus accelerate anaerobic activity.

The ability of the anerobes to convert aerobes and their slimes to gases, which are usually principally methane, can be used to great advantage in one process. In this process the growth of aerobic bacteria is carried out as described above with no particular effort being made to recover the oil as such. The effort, rather, is to inoculate as much as possible of the reservoir with aerobic and anaerobic bacteria, supply the aerobes with sufficient air to allow them to grow, and convert a substantial amount of the residual oil to aerobic bacteria and slimes, and finally cut off the air. As a result, the aerobes die and the anaerobes begin the decomposition of the dead aerobes and their slimes. The gases which are produced by the anaerobes are recovered from wells penetrating the formation and are sold as fuel gas or otherwise utilized. If desired, the process can be carried out in several cycles until substantially all the residual oil has been converted into gases. The dormant resting stages of the aerobes and anaerobes may permit this cycling without reinoculating the formation with either aerobes or anaerobes. Preferably, however, the formation is reinoculated with both types of bacteria at the time air injection is resumed to insure against long incubation periods before rapid growth of the aerobes takes place.

When reference is made to aerobes, facultatives, and anaerobes it should be remembered that division between these classes is rather arbitrary and indistinct. Some bacteria are strict obligate aerobes which cannot exist in the absence of oxygen. Others are strict obligate anaerobes which cannot exist in the presence of oxygen. Between these extremes are the species which can grow, or at least remain alive, under a very wide range of conditions. For my purposes, an aerobic bacteria is one which will grow in the presence of oxygen under the conditions in the formation. An anaerobic bacteria is one which will remain alive after the air is cut off and will grow in the absence of oxygen under formation conditions. In this connection it will be understood that bacteria are representative of microorganisms in general which will utilize hydrocarbons and convert the hydrocarbons to other chemicals. When a soil sample is used as the source of bacteria, other microorganisms such as fungi, yeasts, molds, and the like will also be present. Some of these may, and probably will, be carried through adapting cultures and will be introduced into the formation. The presence of such microorganisms may not be undesirable since some of these also adapt easily to various forms of nutrient and may aid in the conversion of hydrocarbons to more desirable chemicals. The dividing lines between these classes of microorganisms are not very distinct, particularly between bacteria and fungi. Many classifications group the fungi and bacteria together, usually classifying bacteria as a division of the fungi. It may be best, therefore, to use the terms aerobic microorganisms and anaerobic microorganisms to include all these organisms which can convert hydrocarbons in the formation to other chemicals, whatever their arbitrary classifications might be. Of these microorganisms, those usually classified as bacteria are, however, preferred.

Bacteria require certain elements in addition to the carbon and hydrogen in hydrocarbons and the oxygen in air. One of the most important of these additional elements is nitrogen, which is needed in the formation of proteins. It is true that if air is used as a source of oxygen, nitrogen will also be present. Some forms of bacteria can utilize such free nitrogen. Many, however, cannot. It is also true that many formations and formation brines contain sufficient nitrogen in the form of ammonium salts for bacterial growth. The crude oil may also contain organic nitrogen compounds. It may be desirable in many cases, however, to include in the inoculating solution, and possibly in the cooling water, at least small amounts of ammonia or of nitrogen-containing salts such as sodium nitrate, ammonium sulfate, ammonium phosphate, ammonium nitrate, or the like. Other necessary elements such as phosphorous as sodium phosphate, sulfur as sodium sulfate, and potassium as potassium chloride, nitrate, sulfate or the like can also be included. Trace elements such as iron, copper, and iodine can be added if needed, although these are ordinarily present in sufficient amounts. All chemicals should be highly soluble to avoid excessive loss from solution. They should be used in low concentrations to avoid the possibility of loss by precipitation of insoluble reaction products.

Organic materials may also be added to the inoculating solution, cooling water, flooding water, and the like. For example, sugars such as sucrose, or preferably molasses, can be used. It is true that the microorganisms to be used in my process are capable of catalyzing the oxidation of oil in the formation. It has been found, however, that some species of bacteria which are capable of catalyzing such reactions do not rely entirely on the hydrocarbons as a source of carbon or energy. Growth of some of these species is aided if other sources of carbon are provided for cell-building purposes. The carbohydrates are usually good sources of carbon. Other easily utilized organic materials, such as gelatin, may be added as sources of both carbon and nitrogen. Still other organic materials, such as agar, will occur to those skilled in the art.

Either organic or inorganic additives to cooling water or flooding water can prove to be prohibitively expensive if used in high concentrations. I have found, however, that a concentration of more than about 10 parts per million by weight of any particular ingredient in the water is seldom necessary. In the laboratory, for example, a concentration of 15 parts per million total organics in a nutrient solution has been found to be considerably more than the minimum required to promote rapid growth of bacteria in a flowing system.

Since water naturally present in earth formations ordinarily contains at least traces of all essential inorganic chemicals, and since the oil itself can serve as organic food for the bacteria, the addition of a total of more than about 10 or 20 parts per million of nutrients to injected water is rarely advisable. In many cases no added nutrients at all are required.

Oil field brines often contain high concentrations of inorganic salts. These salts are not harmful to growth of bacteria in a rather wide range of concentration. For example, laboratory experiments have shown that good growth of bacteria in the presence of crude oil takes place when the water phase which is present contains salt concentrations in the range from about 10,000 to about 50,000 parts per million by weight. Concentrations of salts above about 50,000 parts per million, however, tend to retard growth of bacteria. Therefore, for best results, brines containing more than about 50,000 parts per million dissolved salts should be diluted with less saline water before use in my process.

Unlike many secondary recovery processes, the volumes of inoculating solution, air and cooling water in my process are not particularly critical. The bacteria increase in number and expand into a large volume regardless of the original volume. In addition, further bacteria can be introduced at any time, as desired. For best results, the volumes of alternate slugs of air and cooling water should be as small as possible within the limits of convenience. Theoretically, the air and water can be introduced simultaneously, but this has been found to be difficult in practice because of a tendency of the water and air to separate in the injection well. The result is that most of the air enters the top and most of the water enters the bottom of the formation. It is generally advisable, therefore, to inject air for a period of a few hours or days and then inject sufficient water to control the temperature, maintain the desired water saturation in the reservoir, and sweep chemicals through the formation. Injection of air can then be resumed.

Recovery of gaseous products of anaerobic bacterial attack on aerobic bacteria and their slimes has already been mentioned. Recovery and separation of other products is also possible. For example, after the aerobic bacteria have acted for a short time, such as a few days or weeks, the reaction products can be displaced from the formation with water. The chemicals, being to at least some degree mutual solvents for oil and water, aid in displacing residual oil through the formation to the producing well when water is injected to force these chemicals through the formation. The oil in this case is, of course, followed by a bank of chemicals. These chemicals may be recovered and separated by any of the known processes of absorption, extraction, distillation or the like. The amount of oil and the amount and type of chemicals recovered depend upon the particular conditions of the reservoir, the bacteria employed, time of growth, and many other factors.

If desired, chemicals may be added to the flooding water following the bacteria. For example, after the bacteria have been permitted to grow for a time, the resulting organic chemicals may be displaced with a sodium hydroxide solution. This has the dual function of increasing the permeability of the formation, as mentioned previously, by dissolving the slimes and forming sodium salts of fatty acids resulting from the bacterial growth. In addition, the viscosity of the aqueous solution is desirably increased by solution of the soaps and dispersed organics. These soaps perform a detergent flood of the formation. Hypochlorites and peroxides are also known to dissolve bacterial slimes and can be used to form a hot bank of a solution of organic chemicals which can be forced through the formation to increase oil recovery.

In the process described above, the temperature of the formation is carefully controlled to avoid exceeding the temperature level at which bacteria stop growing. It is also possible to use aerobic bacteria in processes in which the bacteria are killed by high temperature after a short period of growth. In one such process, the aerobic bacteria are injected and air is introduced into the formation until the temperature rises to a level at which the bacteria are killed. Water is then introduced to force a bank of hot chemicals through the formation to obtain a better recovery of residual oil. Chemicals such as water-soluble hydroxides and hypochlorites can be added to the water if desired.

In another process the formation is inoculated with aerobic bacteria and air is then introduced. As in the previous case, the temperature rapidly rises due to bacterial action to a level of about 150° F. at which most of the bacteria are killed. In this case, however, the introduction of air is continued. The result is that the temperature continues to rise rapidly. The reason is that the partial oxidation products of the bacteria are easily oxidized by the air to increase the temperature to above about 200° F. At such elevated temperatures the rate of oxidation of the oil by the air is sufficient to cause further rapid increase of temperature until the oxygen of the air reacts almost instantaneously with hydrocarbons. Underground combustion then proceeds as usual. Thus, it is possible to employ aerobic bacteria to initiate underground combustion of oil.

When the aerobic bacteria oxidize low molecular weight hydrocarbons, many water-soluble alcohols, ketones, aldehydes, and acids are produced together with some water-soluble organic compounds containing sulfur and nitrogen, for example. These chemicals dissolve in the cooling water flowing past the bacteria with the air. The chemicals are carried through the oil-bearing formation in the water and are recovered through producing wells as water solutions. As previously noted, these chemicals may be separated from the water and from each other before use or sale. It is also possible to use the chemicals without separation, either in water solution or in concentrated form.

One process for using the mixed chemicals employs a fuel cell. In this process the chemicals in water solution are placed in contact with one electrode of a fuel cell. The other electrode of the cell is in contact with oxygen. The electrodes are connected by electrolytes. The oxygen ionizes at its electrode. The ions flow through the electrolyte to the electrode exposed to the chemicals where the reaction of the oxygen ions with the chemicals takes place to form carbon monoxide, carbon dioxide, water and the like. An electrical potential is thus generated between the electrodes. It is also possible to place an electrode in the producing well so the chemicals can be oxidized without removal to the surface. The process in this case is much as described in my U.S. Patent No. 3,288,648, except that oxygenated chemicals rather than hydrocarbons are oxidized.

The processes described above are applicable to greatest advantage where other means of recovery are not applicable. For example, in many reservoirs the oil is too viscous to permit economic recovery. My processes which produce both heat and solvents, which decrease the oil viscosity, are obviously applicable to the recovery of such viscous oils. The process which converts oil to gaseous products can also be used to advantage in such cases. Shallow reservoirs which have been previously water-flooded are particularly desirable. The temperature is low, the remaining oil is dispersed in a form having a large surface area for attack by the bacteria, and the water content of the formation is desirably high. It will be apparent, however, that any of the processes can be applied to any oil-bearing formation in any degree of depletion.

Many additional variations and modifications of my process are possible. The above-described processes should, therefore, be considered as examples rather than limits. The invention should be limited only by the terms of the following claims.

I claim:
1. A method for oxidizing hydrocarbons having less than about 10 carbon atoms per molecule in an underground oil-bearing formation comprising inoculating said formation with aerobic bacteria capable of attacking said hydrocarbons, injecting into said formation sufficient oxygen to permit growth of said bacteria, permitting said bacteria to grow for a sufficient time to generate heat and chemicals, introducing into said formation an aqueous solution of an inorganic chemical capable of dissolving bacterial slimes, and forcing said aqueous solution through the formation to an outlet, whereby a hot bank of a solution of organic chemicals progresses through the formation to aid in the recovery of oil from said formation through said outlet.

2. The process of claim 1 in which said inorganic chemical is selected from the group consisting of water-soluble hydroxides, peroxides and hypochlorites.

3. A process for treating an underground oil-bearing formation comprising inoculating said formation with aerobic bacteria capable of utilizing hydrocarbons, said bacteria being cultured in the presence of oil from said formation and at substantially the pressure and temperature in said formation, and the resulting culture being filtered prior to use for inoculating said formation; introducing oxygen into the inoculated portion of said formation to cause growth of said bacteria, and introducing sufficient cooling fluid into the inoculated portion of said formation to prevent rise of the temperature above the level at which said bacteria will grow.

4. A process for treating an underground oil-bearing formation comprising inoculating said formation with an aerobic microorganism and an anaerobic microorganism capable of remaining alive in the presence of oxygen, said aerobic microorganism being capable of attacking hydrocarbons in said formation, and said anaerobic microorganism being capable of attacking said aerobic microorganism and its products under anaerobic conditions, introducing oxygen into the inoculated portion of said formation to cause growth of said aerobic microorganism, introducing sufficient cooling fluid into the inoculated portion of said formation to prevent rise of the temperature above the level at which said microorganisms will grow, interrupting the introduction of oxygen to establish anaerobic conditions within said formation and thus permit said anaerobic microorganism to become active, and recovering from said formation products of the activity of said microorganisms.

5. The process of claim 4 in which said microorganisms are species of bacteria and said oxygen is introduced in the form of air.

6. The process of claim 5 in which said cooling fluid is water.

7. The process of claim 5 in which a large slug of water is introduced into the formation following interruption of the introduction of air whereby the establishment of anaerobic conditions, and consequent activity of the anaerobic bacteria, is accelerated.

8. The process of claim 5 in which said species of bacteria are cultured in the presence of oil from said formation, and at substantially the pressure and temperature in said formation, and the resulting culture is filtered prior to use for inoculating said formation.

9. The process of claim 5 in which said formation is fractured prior to inoculation with bacteria and introduction of air, to aid in displacing the bacteria and air farther back into the formation.

References Cited

UNITED STATES PATENTS

| | | | |
|---|---|---|---|
| 2,413,278 | 12/1946 | Zobell. | |
| 2,907,389 | 10/1959 | Hintzman | 166—8 |
| 2,975,835 | 3/1961 | Bond | 166—42 |
| 3,105,014 | 9/1963 | Harrison | 166—8 X |
| 3,185,216 | 5/1965 | Hintzman | 166—42 |
| 3,278,335 | 10/1966 | Hintzman | 136—85 |

CHARLES E. O'CONNELL, *Primary Examiner.*

STEPHEN J. NOVOSAD, *Examiner.*